United States Patent Office 3,723,138
Patented Mar. 27, 1973

3,723,138
STABILIZATION OF SILVERING SOLUTIONS
Helmut Franz, Pittsburgh, Pa., assignor to PPG Industries, Inc., Pittsburgh, Pa.
No Drawing. Filed Sept. 9, 1971, Ser. No. 179,175
Int. Cl. C23c 3/02
U.S. Cl. 106—1   10 Claims

ABSTRACT OF THE DISCLOSURE

Electroless plating solutions containing silver cations, which heretofore have been plagued by limited pot life and by the precipitation of dark precipitates during use, are stabilized by the inclusion therein of a persulfate, particularly ammonium persulfate.

BACKGROUND OF THE INVENTION

Electroless plating solutions containing silver cations are used to prepare silver films on substrates, such as glass, for use in mirrors and solar reflecting films on transparent viewing closures.

In applying silver films to substrates, such as glass, it is typical to prepare the glass for silvering by thoroughly cleaning the glass and catalytically sensitizing the surface to be filmed. Cleaning involves water washing with brushing and abrasion of the surface with a cleaning compound such as cerium oxide or amorphous silica. This is followed by water rinsing. Catalytic sensitization of non-metallic substrates, such as glass, typically is accomplished by contacting the substrate with a tin salt solution after cleaning. In some instances further sensitization using a noble metal, such as platinum or palladium may be employed. (See U.S. Pat. No. 2,702,253).

The sensitized film is typically water rinsed and then is contacted with an electroless plating solution containing silver cations and a reducing agent to reduce the silver.

In a typical operation, the silver cation-containing plating solution is mixed with an aqueous solution containing the reducing agent just prior to plating the substrate. The silver solutions employed generally are aqueous amine or ammoniacal, alkaline solutions containing a silver salt; for example, silver nitrate, ammonium hydroxide and sodium hydroxide. Alternatively, the silver plating solution may contain potassium hydroxide.

While it is desirable for convenience to prepare a highly concentrated silver solution and dilute it with water at the time of plating, this has not generally been possible. At all useful silver concentrations there occurs some decomposition of the solutions with time. At high silver concentrations, above about 2 grams silver nitrate per liter, for example, silver is precipitated almost at once from a sodium hydroxide-containing solution. Even at lower concentrations the solutions are not stable. Within a few hours after preparation, a discoloration from yellow to amber to brown occurs, and a black precipitate is then formed. After such decomposition the solution is useless for silvering.

Additionally, a problem accompanying decomposition is the formation of compounds which are explosive and which may detonate as the result of mechanical disturbance. This problem of forming an explosive combination of compounds is particularly acute in solutions containing potassium hydroxide and the danger of explosion increases in solutions having either alkali metal hydroxide with increasing concentrations of the active ingredients; silver salt, ammonium hydroxide and alkali metal hydroxide. The critical nature of silvering solution instability may be appreciated from a reading of National Bureau of Standards Circular No. 387.

While it has long been thought that decomposition of silvering solutions was due primarily to hydrolyzation of a silver-amine complex in the solution, and that inclusion of a complexing agent in the solution might help to maintain the silver in solution, this has not been a particularly successful approach. Some common complexers have been found to reduce the silver and/or precipitate it from solution.

SUMMARY OF THE INVENTION

In accordance with this invention, it has been found that aqueous alkaline solutions containing silver cations can be effectively stabilized and the prior-art problem avoided or drastically minimized.

Thus, an aqueous, alkaline silvering solution containing a silver salt, an ammonium or amine compound and an alkali metal hydroxide is stabilized in accordance with this invention by the inclusion therein of a persulfate compound.

In order to effectively stabilize a silvering solution containing 0.05 to 1.0 and, more particularly, 0.1 to 0.3 percent by weight of a silver salt, such as silver nitrate, and substantially prevent unwanted bulk precipitation of silver from solution while avoiding any interference with the plating of silver therefrom when it is contacted or mixed with a reducing agent, the solution preferably contains from 0.001 to 0.3 percent by weight, preferably 0.01 to 0.2 percent by weight, and more preferably 0.01 to 0.1 percent by weight, of a persulfate compound. A maximum effective amount of the persulfate compound is established as the amount of the persulfate compound which does not substantially retard silver deposition on a sensitized substrate in the presence of a reducing agent such as dextrose or an invert sugar. Plating to a transmittance of 50 percent (as described below) within 5 minutes is considered unretarded plating. The stabilization of this invention is particularly effective for solutions containing from about 0.3 to about 1.0 percent by weight ammonia and from about 0.1 to about 0.3 percent by weight of an alkali metal hydroxide, such as sodium hydroxide.

Although a variety of persulfate compounds may effectively be employed, persulfate compounds which are readily soluble in water and which dissociate in solution or react slowly are particularly suited in the solutions contemplated by this invention. Useful persulfate compounds include alkali metal, alkaline earth metal and ammonium persulfates. Of particular utility is ammonium persulfate. Ammonium persulfate is particularly suited for inclusion is an ammoniacal silvering solution since it introduces no new species of cations into the solution. The persulfate ion ($S_2O_8^{2-}$) has a high oxidation potential (2.06 volts) but dissociates or reacts slowly. It may be catalyzed by the silver ($Ag^+$) ions which may be oxidized to silver ($Ag^{2+}$) ions by the persulate ($Ag^+$ to $Ag^{2+}$ has an oxidation potential of 1.98 volts). The presence of the persulfate in the amounts found effective in this invention does not interfere with plating, and it is believed that excess reducer merely reduces it to the innocuous sulfate.

The persulfates utilized in this invention are found useful to stabilize silver-containing solutions whether complexed with ammonia, amine complexers; such as, ethylene-diaminetetraacetic acid (EDTA), monoethanolamine (MEA), diethanolamine (DEA), or the like.

DESCRIPTION OF THE PREFERRED EMBODIMENTS

This invention will be more fully appreciated from the specific examples which follow.

EXAMPLE I

A silvering solution was prepared as follows:
Silver nitrate ($AgNO_3$) ---------------- g./l__ 2.38
Ammonium hydroxide ($NH_4OH$, 28%) ___ml./l__ 4.75
Sodium hydroxide (NaOH) ---------------g./l__ 1.58
Water, remainder to 1 liter.

Within one hour at ambient temperatures this solution was discolored from a clear, colorless solution to a definite yellow color.

Portions of the solution were placed in separate containers, and varying amounts of ammonium persulfate were added to each. All solutions cleared to their original clear color after the ammonium persulfate addition. The samples discolored after a time, and precipitation later occurred as summarized in Table 1.

TABLE 1

|  | Control | A | B | C | D | E |
|---|---|---|---|---|---|---|
| Percent by weight ammonium persulfate | 0 | 0.03 | 0.06 | 0.10 | 0.15 | 0.20 |
| Hours until discoloration | 1 | 6 | 10 | 11 | 12 | 12 |
| Hours until precipitation | 1 | 12 | 14 | 16 | >24 | >24 |

As may be noted from Table 1, increasing the content of oxidizing agent increases the life of the silvering solution.

EXAMPLE II

A silvering solution was prepared as in Example I and diluted with two parts of water to one part of silvering solution.

Within one hour this solution was discolored from its original clear color to a yellow color.

Portions of the solution were placed in separate containers, and a varying amount of ammonium persulfate was added to each. All solutions cleared after ammonium persulfate addition. The samples were observed to discolor with time, and precipitation occurred as summarized in Table 2.

TABLE 2

|  | Control | F | G | H | J | K |
|---|---|---|---|---|---|---|
| Percent by weight ammonium persulfate | 0 | 0.01 | 0.02 | 0.03 | 0.05 | 0.07 |
| Hours until discoloration | 1 | 10 | 11 | 14 | >24 | >24 |
| Hours until precipitation | 9 | >24 | >24 | >24 | >24 | >24 |

EXAMPLE III

Equal portions of silvering solution, as in Example II, and of an aqueous reducer solution containing about 0.26 gram of dextrose per liter were mixed and immediately poured into pre-sensitized glass test tubes. The interior of the test tubes were prepared for coating by thorough washing followed by catalytic sensitization using a tin salt solution (about 1 gram of stannous chloride per liter) to contact the glass for about 30 seconds to one minute.

The silvering solutions were permitted to remain in the test tubes for various times after which the silvering solutions were poured out. Each test tube was rinsed with water, then acetone, and was then allowed to dry. The extent of film deposition was determined by comparing the light transmittance through coated test tubes with that through an uncoated test tube. A light beam having a wavelength of about 525 nanometers was passed through each test tube along a line corresponding to the diameter of the circular cross section of the test tube so that the beam passed through two coated surfaces. The transmittance for each coated test tube was determined in comparison to 100 percent transmittance established for an uncoated test tube. The results are summarized in Table 3.

No effect on plating rate is noted for persulfate concentrations up to 0.03 percent by weight during the first 30 seconds. At a concentration of 0.05 percent by weight persulfate, the initial plating rate slows down, but after three minutes the deposited film is as dense as at lower persulfate concentrations. An extension of the data of Table 3 indicates that at a persulfate concentration of about 0.3 percent by weight a transmittance of 50 percent may be reached in about 5 minutes of plating time.

TABLE 3

| Sample | Weight percent ammonium persulfate | Bulk precipitation time | Percent transmittance after plating for indicated time— | | | | | |
|---|---|---|---|---|---|---|---|---|
|  |  |  | 15 sec. | 30 sec. | 45 sec. | 60 sec. | 120 sec. | 180 sec. |
| Control | 0 | 50 sec. | 41 | 24 | 21 | 18 | 18 | 17 |
| F | 0.01 | 2 min. 20 sec. | 40 | 24 | 16 | 12 | 9 | 8 |
| G | 0.02 | 3 min. 10 sec. | 38 | 24 | 17 | 15 | 10 | 8 |
| H | 0.03 | 4 min. 30 sec. | 37 | 27 | 17 | 15 | 10 | 7 |
| J | 0.05 | 6 min. 10 sec. | 68 | 34 | 25 | 20 | 11 | 8 |
| K | 0.07 | 25 min. | 100 | 96 | 90 | 67 | 18 | 14 |

A substrate may be silvered according to this invention by dipping, spraying, dripping, brushing, rolling or otherwise contacting the substrate with a mixture of a silver-containing solution stabilized according to this invention and a reducer-containing solution. For example, a silver-containing concentrate and a reducer-containing concentrate may be independently fed to separate spray guns with in-line or external mixing devices so that water is mixed with the concentrates, diluting them, and the dilute mixtures sprayed together on a substrate.

This invention may effectively be employed to improve the method of preparing glass articles coated with silver and overcoated with copper which is described in U.S. Pat. No. 3,457,138 of Richard G. Miller. Silver solutions stabilized by the present method may be applied to glass sheets according to the method of that disclosure, which is here incorporated by reference. Coppering solutions may then be applied to the silvered glass as described in U.S. Pat. No. 3,457,138.

In the processing of a plurality of successive plates of glass, improved uniformity of film thickness and quality is noted as compared to the practice of the same method without the silver solution stabilization of the instant invention. Uniformity of thickness is determined by noting the uniformity of visible light transmittance across large plates (40 to 100 inches across) using a Gardner Large Area Hazemeter, (Gardner Labs, Inc., Bethesda, Md.), and the uniform quality of films is visually determined by viewing samples when backlighted by a uniform area white light source comprising a fluorescent light with a milk white diffusing face plate.

Although the present invention has been described with particular reference to specific embodiments, it is not to be considered limited thereby.

I claim:

1. In the electroless plating of a substrate with silver wherein an aqueous silver salt solution and a reducing agent for the silver cation contact the substrate to be coated to deposit a silver film on the substrate and wherein the plating is characterized by a relatively short life of the silver salt solution from which silver precipitates in a dark precipitate the improvement whereby the life of a silver salt solution is extended comprising the inclusion as an essential ingredient in the silver salt solution an effective amount of a persulfate compound to retard precipitation of silver from the solution while permitting substantially unretarded deposition of silver onto a substrate, said persulfate compound being selected from the group consisting of alkali metal, alkaline earth metal and ammonium persulfates and mixtures thereof.

2. The method according to claim 1 wherein the aqueous silver salt solution contains from about 0.001 to about 0.5 percent by weight of the persulfate compound.

3. The method according to claim 1 wherein the aqueous silver salt solution contains from about 0.01 to about 0.2 percent by weight of the persulfate compound.

4. The method according to claim 1 wherein the persulfate compound is ammonium persulfate.

5. The method according to claim 1 wherein the silver salt solution contains ammonia.

6. A stable aqueous silver salt solution containing as an essential ingredient, a persulfate compound selected from the group consisting of alkali metal, alkaline earth metal and ammonium persulfates and mixtures thereof as 0.001 to 0.5 percent by weight of the solution.

7. The silver salt solution of claim 6 wherein the silver solution contains ammonia.

8. The silver salt solution of claim 6 containing 0.05 to 1.0 percent by weight silver, as silver nitrate.

9. The silver salt solution of claim 6 wherein the persulfate compound is ammonium persulfate.

10. A stable aqueous, alkaline silver solution comprising:

| | Percent by weight |
|---|---|
| Silver (calculated as $AgNO_3$) | 0.1–0.3 |
| Ammonia (calculated as $NH_4OH$) | 0.3–1.0 |
| Alkali metal hydroxide (calculated as NaOH) | 0.1–0.3 |
| A persulfate compound (calculated as $(NH_4)_2S_2O_8$) | 0.01–0.1 |

References Cited
UNITED STATES PATENTS 2,963,383  12/1960  Weinrich _____ 117—35 S
2,996,406  8/1961   Weinrich _____ 117—35 S LORENZO B. HAYES, Primary Examiner U.S. Cl. X.R.
117—35 S, 124 C